United States Patent
Kim et al.

(10) Patent No.: US 9,591,664 B2
(45) Date of Patent: Mar. 7, 2017

(54) METHOD FOR SETTING SEARCH SPACE FOR RELAY NODE IN WIRELESS COMMUNICATION SYSTEM AND DEVICE THEREFOR

(75) Inventors: Hakseong Kim, Anyang-si (KR); Hanbyul Seo, Anyang-si (KR); Byounghoon Kim, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 13/979,342

(22) PCT Filed: Feb. 1, 2012

(86) PCT No.: PCT/KR2012/000779
§ 371 (c)(1),
(2), (4) Date: Jul. 11, 2013

(87) PCT Pub. No.: WO2012/115361
PCT Pub. Date: Aug. 30, 2012

(65) Prior Publication Data
US 2013/0294332 A1  Nov. 7, 2013

Related U.S. Application Data

(60) Provisional application No. 61/444,996, filed on Feb. 21, 2011.

(51) Int. Cl.
*H04W 72/14* (2009.01)
*H04L 5/00* (2006.01)
(Continued)

(52) U.S. Cl.
CPC ......... *H04W 72/14* (2013.01); *H04J 11/0069* (2013.01); *H04L 5/0048* (2013.01);
(Continued)

(58) Field of Classification Search
None
See application file for complete search history.

(56) References Cited

U.S. PATENT DOCUMENTS

2009/0274077 A1* 11/2009 Meylan ................. H04W 28/06 370/280
2009/0296619 A1* 12/2009 Sammour ............... H04W 4/08 370/311

(Continued)

OTHER PUBLICATIONS

LG Electronics Inc., "Remaining Details in Non-Interleaving R-PDCCH Transmission," 3GPP TSG RAN WG1 Meeing #63, Agenda Item 6.6.1, R1-106135, Nov. 15-19, 2010, Jacksonville, Florida USA, 7 pages.

(Continued)

*Primary Examiner* — Jeffrey M Rutkowski
*Assistant Examiner* — Jonathan B Wood
(74) *Attorney, Agent, or Firm* — Birch, Stewart, Kolasch & Birch, LLP

(57) ABSTRACT

Disclosed in the present invention is a method for a relay node to receive a control signal from a base station in a wireless communication system. More particularly, the present invention comprises the steps of: receiving a downlink signal from the base station; and obtaining control information for the relay node by blind-decoding the downlink signal, wherein a search space for blind decoding is located in the data region of a subframe, and is divided into a search space for a downlink grant and a search space for an uplink grant. When the subframe corresponding to the control information for the relay node is a downlink (DL) standalone, the search area including only the search space for the downlink grant, or the search area for the uplink grant being set as an invalid search space would be desirable.

4 Claims, 10 Drawing Sheets

(51) Int. Cl.
*H04J 11/00* (2006.01)
*H04W 16/26* (2009.01)
*H04W 84/04* (2009.01)
*H04B 7/155* (2006.01)
*H04W 48/16* (2009.01)

(52) U.S. Cl.
CPC .......... *H04B 7/15542* (2013.01); *H04L 5/001* (2013.01); *H04L 5/0053* (2013.01); *H04W 16/26* (2013.01); *H04W 48/16* (2013.01); *H04W 84/047* (2013.01)

(56) References Cited

U.S. PATENT DOCUMENTS

| | | | | |
|---|---|---|---|---|
| 2010/0120442 A1* | 5/2010 | Zhuang | ............... | H04B 7/15507 455/450 |
| 2010/0331030 A1* | 12/2010 | Nory | ............... | H04L 5/0053 455/509 |
| 2011/0038303 A1* | 2/2011 | Ji | ............... | H04W 74/002 370/315 |
| 2011/0044259 A1* | 2/2011 | Nimbalker | ............... | H04L 5/001 370/329 |
| 2011/0069637 A1* | 3/2011 | Liu | ............... | H04L 5/0007 370/254 |
| 2011/0105162 A1* | 5/2011 | Kim | ............... | H04L 1/001 455/500 |
| 2011/0194412 A1* | 8/2011 | Park | ............... | H04L 5/0007 370/241 |
| 2011/0243059 A1* | 10/2011 | Liu | ............... | H04L 1/0046 370/315 |
| 2011/0268056 A1* | 11/2011 | Soong | ............... | H04W 72/0406 370/329 |
| 2012/0054258 A1* | 3/2012 | Li | ............... | H04W 72/0406 709/201 |
| 2012/0087318 A1* | 4/2012 | Liu | ............... | H04W 16/04 370/329 |
| 2012/0122495 A1* | 5/2012 | Weng | ............... | H04W 68/025 455/458 |
| 2012/0170504 A1* | 7/2012 | Hoymann | ............... | H04B 7/155 370/312 |
| 2012/0176957 A1* | 7/2012 | Chen | ............... | H04B 7/155 370/315 |
| 2012/0201216 A1* | 8/2012 | Wu | ............... | H04L 5/0053 370/329 |
| 2013/0010682 A1* | 1/2013 | Kim | ............... | H04W 72/1289 370/315 |
| 2013/0136006 A1* | 5/2013 | Kim | ............... | H04L 5/001 370/241 |
| 2013/0148593 A1* | 6/2013 | Suzuki | ............... | H04L 5/0051 370/329 |

OTHER PUBLICATIONS

LG Electronics Inc., "Un DL Resource Assignment and UL Grant Placement," 3GPP TSG RAN WG1 Meeting #62bis, Agenda Item 6.6.5, R1-105350, Oct. 11-15, 2010, Xian, China, 6 pages.

Motorola, "On Remaining Details of Relay Control Signalling," 3GPP TSG RAN WG1 Meeting #63, Agenda Item 6.6, R1-106294, Nov. 15-19, 2010, Jacksonville, Florida, USA, 3 pages.

NEC Group, "Search Space Design and RE Mapping for the Non-Interleaved R-PDCCH with CRS and DMRS," TSG-RAN WG1#62bis, Agenda Item 6.6.1, R1-105419, Oct. 11-15, 2010, Xian, China, 8 pages.

Samsung, "Search Space Design for R-PDCCH with CRS," 3GPP TSG RAN WG1 #62bis, Agenda Item 6.6.1, R1-105401, Oct. 11-15, 2010, Xian, China, 2 pages.

* cited by examiner

FIG. 2
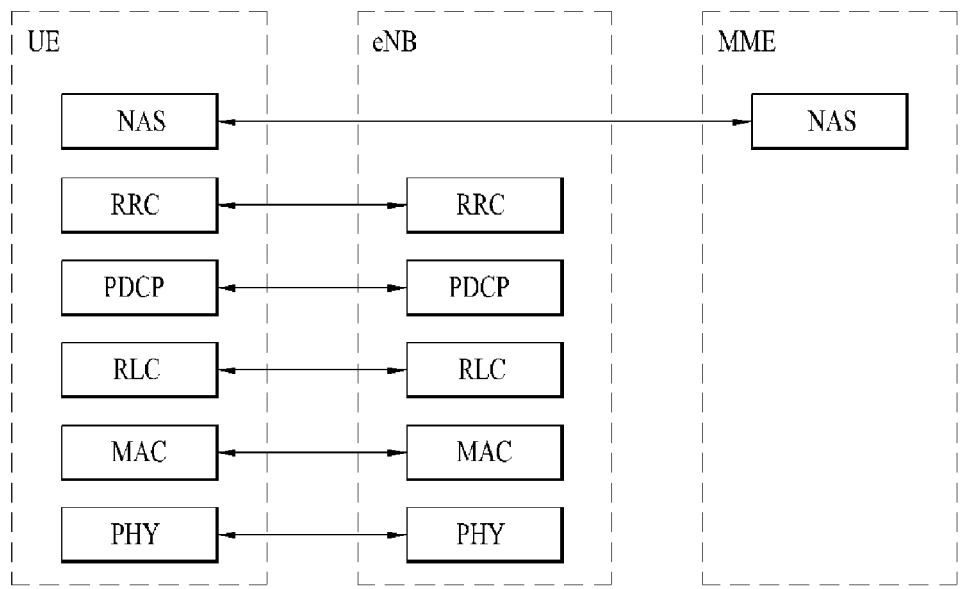
(a) contol - plane protocol stack
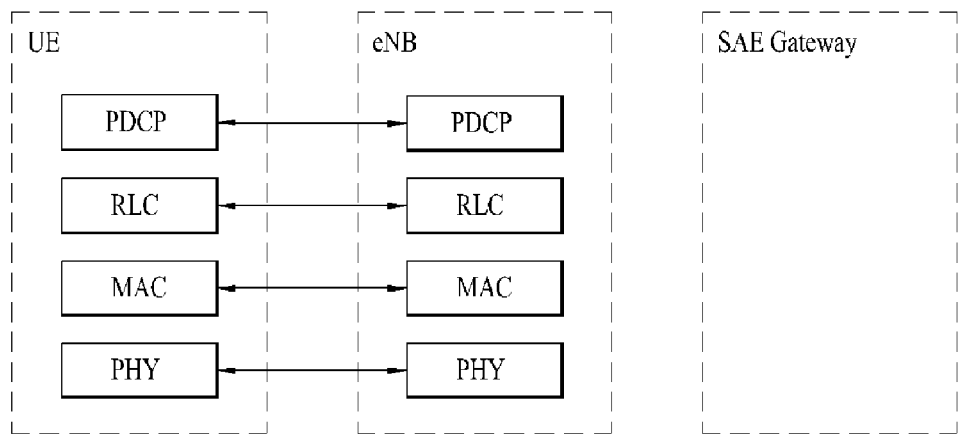
(b) user - plane protocol stack

FIG. 6
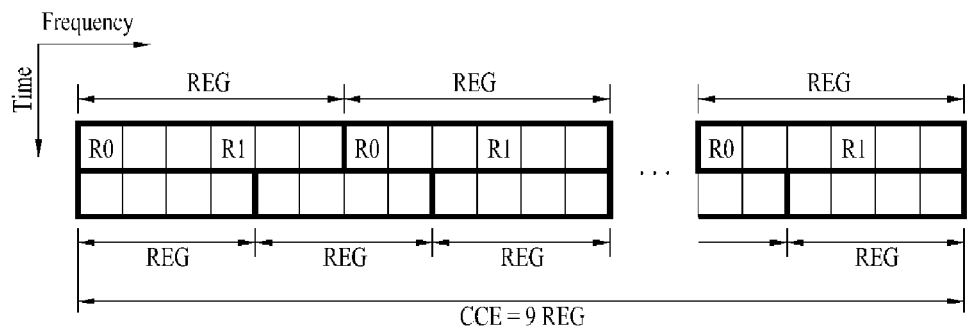
(a) 1TX or 2TX
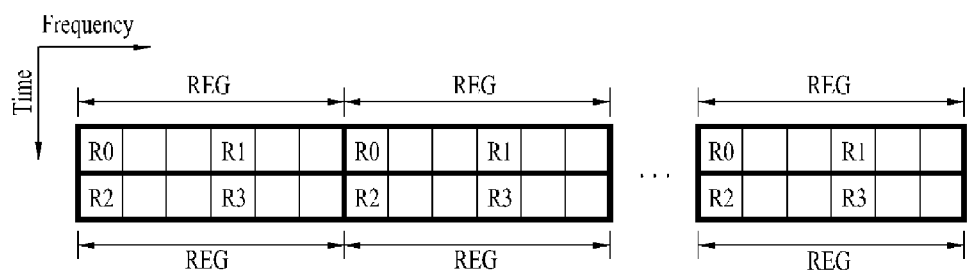
(b) 4 TX
FIG. 7
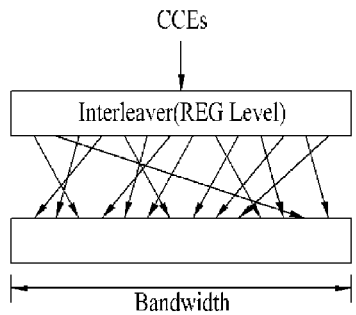

METHOD FOR SETTING SEARCH SPACE FOR RELAY NODE IN WIRELESS COMMUNICATION SYSTEM AND DEVICE THEREFOR

CROSS-REFERENCE TO RELATED APPLICATIONS

This application is the National Phase of PCT/KR2012/000779 filed on Feb. 1, 2012, which claims priority under 35 U.S.C. 119(e) to U.S. Provisional Application No. 61/444,996 filed on Feb. 21, 2011, all of which are hereby expressly incorporated by reference into the present application.

TECHNICAL FIELD

The present invention relates to a wireless communication system, and more particularly, to a method of configuring a search space for a relay node in a wireless communication system and apparatus therefor.

BACKGROUND ART

3GPP LTE ($3^{rd}$ generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '$3^{rd}$ Generation Partnership Project Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Task

Based on the above-mentioned discussion, a method of configuring a search space for a relay node in a wireless communication system and apparatus therefor shall be proposed in the following description.

Technical Solution

To achieve these and other advantages and in accordance with the purpose of the present invention, as embodied and broadly described, a method of receiving a control signal, which is received by a relay node from a base station in a wireless communication system, according to one embodiment of the present invention may include the steps of receiving a downlink signal from the base station and obtaining a control information for the relay node by performing blind decoding on the downlink signal, wherein a search space for performing the blind decoding is located in a data region of a subframe and wherein the search space is partitioned into a search space for a downlink grant and a search space for an uplink grant.

Preferably, if the subframe corresponding to the control information for the relay node is a downlink (DL) standalone subframe, the search space may include the search space for the downlink grant only or the search space for the uplink grant may be set as an invalid search space.

More preferably, if the subframe corresponding to the control information for the relay node is the downlink (DL) standalone subframe, the step of obtaining the control information for the relay node may include the step of performing the blind decoding on the search space for the downlink grant only.

More preferably, the method may further include the step of receiving information related to a downlink standalone subframe from an upper layer or the step of receiving information indicating the search space for the downlink grant and the search space for the uplink grant from an upper layer.

Furthermore, a data channel may be mapped to the invalid search space, thereby increasing resource efficiency.

To further achieve these and other advantages and in accordance with the purpose of the present invention, as embodied and broadly described, a relay node in a wireless communication system may include a receiving module configured to receive a downlink signal from a base station and a processor configured to obtain a control information for the relay node by performing blind decoding on the downlink signal, wherein a search space for performing the blind decoding is located in a data region of a subframe and wherein the search space is partitioned into a search space for a downlink grant and a search space for an uplink grant.

Advantageous Effects

According to an embodiment of the present invention, a search space for a relay node can be effectively configured in a wireless communication system including the relay node. Using the configured search space, the relay node can effectively receive control information.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram of structures of control and user planes of a radio interface protocol between a user equipment and E-UTRAN based on 3GPP radio access network specification.

FIG. 6 is a diagram of a resource unit used in configuring a control channel.

FIG. 7 is a diagram for one example of distributing CCE on a system band.

BEST MODE FOR INVENTION

Figure 1:
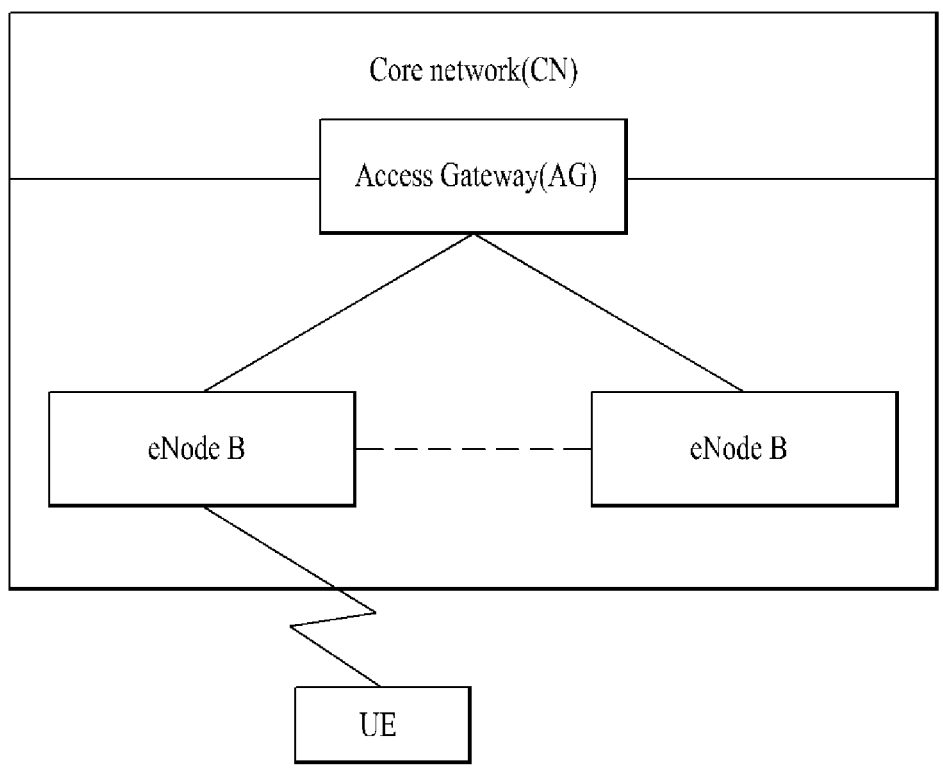
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
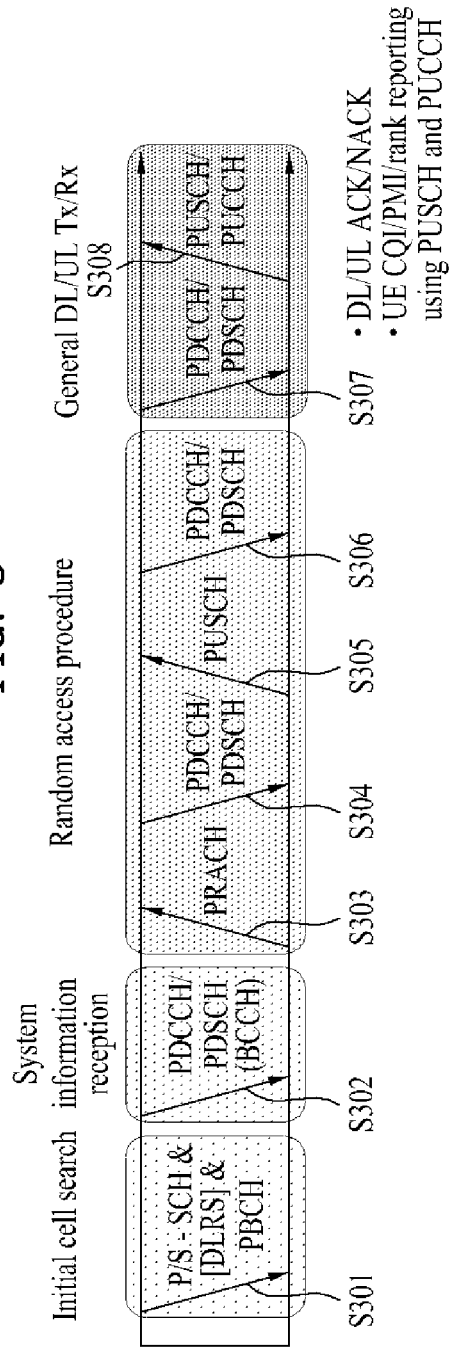
FIG. 3 is a diagram for explaining physical channels used for 3GPP system and a general method of transmitting a signal using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303] and is then able to receive a response message via PDCCH and a corresponding PDSCH in response to the preamble [S304]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
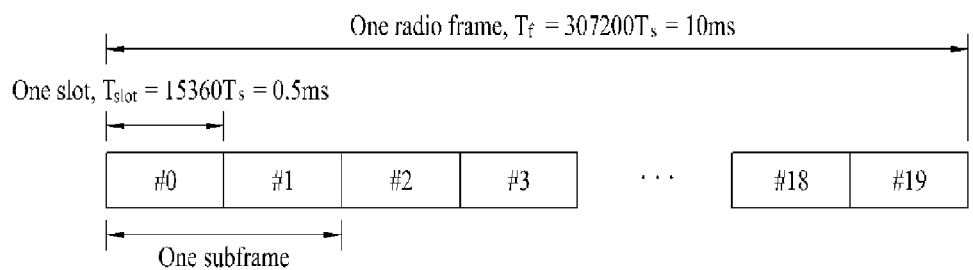
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms ($327200 \cdot T_s$) and is constructed with 10 subframes in equal size. Each of the subframes has a length of 1ms and is constructed with two slots. Each of the slots has a length of 0.5 ms ($15360 \times T_s$). In this case, $T_s$ indicates a sampling time and is expressed as $T_s=1/(15\ \text{kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
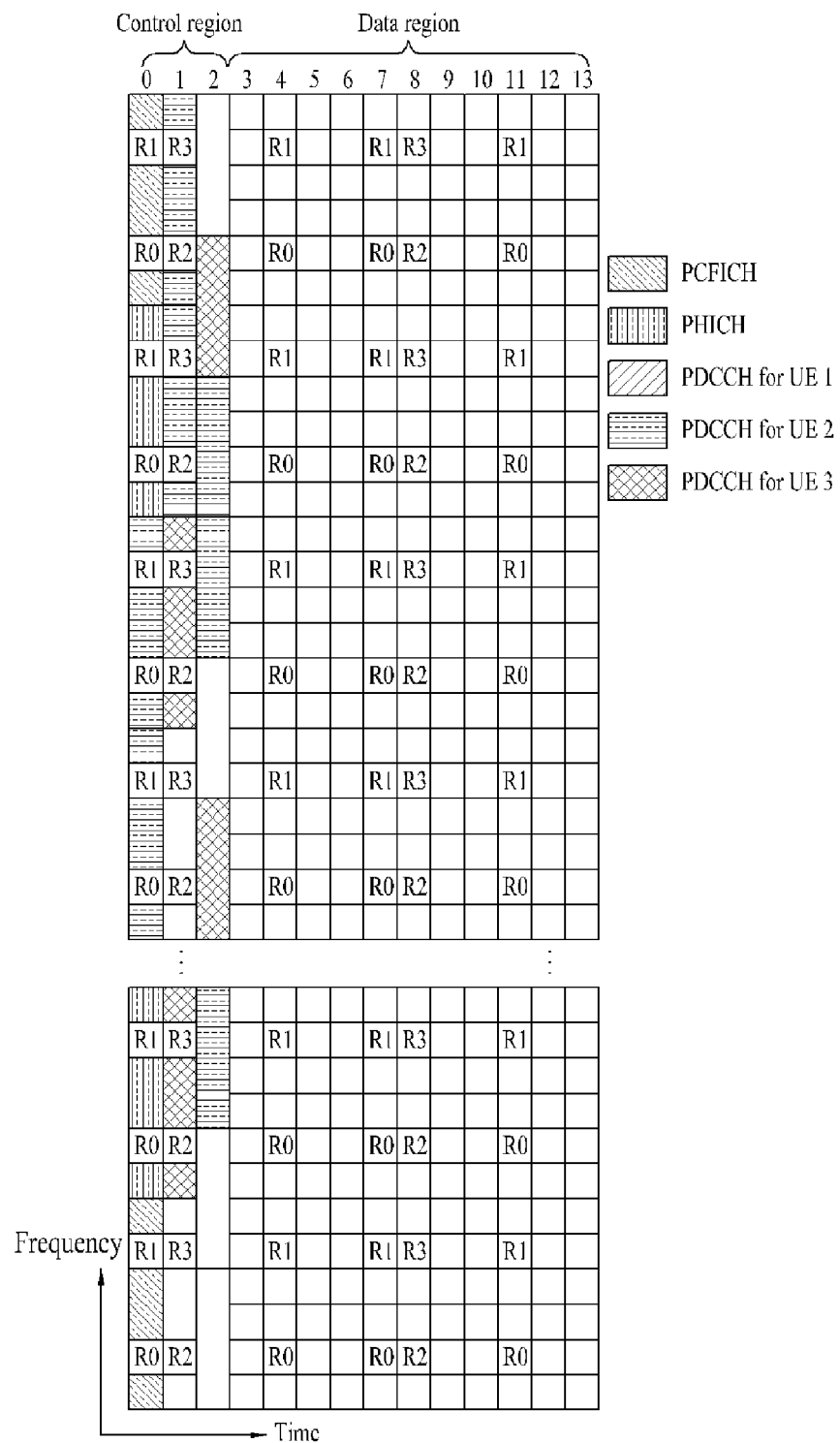
FIG. 5 is a diagram for one example of a structure of a downlink (DL) subframe used by LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

FIG. 6 is a diagram of a resource unit used in configuring a control channel. In particular, FIG. 6(a) shows a case that the number of transmitting antennas of a base station is 1 or 2. And, FIG. 6(b) shows a case that the number of transmitting antennas of a base station is 4. The case shown in FIG. 6(a) only differs from each other in RS (reference signal) pattern but have the same method of configuring a resource unit related to a control channel.

Referring to FIG. 6, a basic resource unit of a control channel is REG. The REG includes 4 neighboring resource elements (REs) except RS. The REG is indicated by a bold line in the drawing. PCFICH and PHICH include 4 REGs and 3 REGs, respectively. PDCCH is configured by CCE (control channel elements) unit and one CCE includes 9 REGs.

A user equipment is set to check $M^{(L)}$ ($\geq L$) CCEs, which are contiguous to each other or arranged by specific rules, in order to check whether PDCCH configured with L CCEs is transmitted to the corresponding user equipment. The L value, which should be considered by the user equipment for PDCCH reception, may become a plural number. CCE sets, which should be checked by the user equipment for the PDCCH reception, are called a search space. For instance, LTE system defines a search space as Table 1.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In Table 1, CCE aggregation level L indicates the number of CCEs configuring PDCCH, $S_k^{(L)}$ indicates a search space of the CCE aggregation level L, and $M^{(L)}$ indicates the number of PDCCH candidates supposed to be monitored in the search space of the aggregation level L.

The search space may be categorized into a UE-specific search space granting an access to a specific user equipment only and a common search space granting accesses to all user equipments in a cell. A user equipment monitors a common search space having a CCE aggregation level set to 4 or 8 and a UE-specific search space having a CCE aggregation level set to 1, 2, 4 or 8. And, the common search space and the UE-specific search space may overlap with each other.

A position of a $1^{st}$ CCE (i.e., CCE having a smallest index) in PDCCH search space given to a random user equipment for each CCE aggregation level value may vary in each subframe according to a user equipment. This may be called a PDCCH search space hashing.

FIG. 7 is a diagram for one example of CCE distribution on a system band. Referring to FIG. 7, a plurality of CCEs logically contiguous to one another are inputted to an interleaver. In this case, the interleaver plays a role in mixing a plurality of the inputted CCEs by REG unit. Hence, frequency/time resources constructing one CCE are distributed in a manner of being physically scattered on a whole frequency/time domain within a control region of a subframe. Although a control channel is configured by CCE unit, interleaving is performed by the REG unit. Therefore, it may be able to maximize frequency diversity and interference randomization gain.

Figure 8:
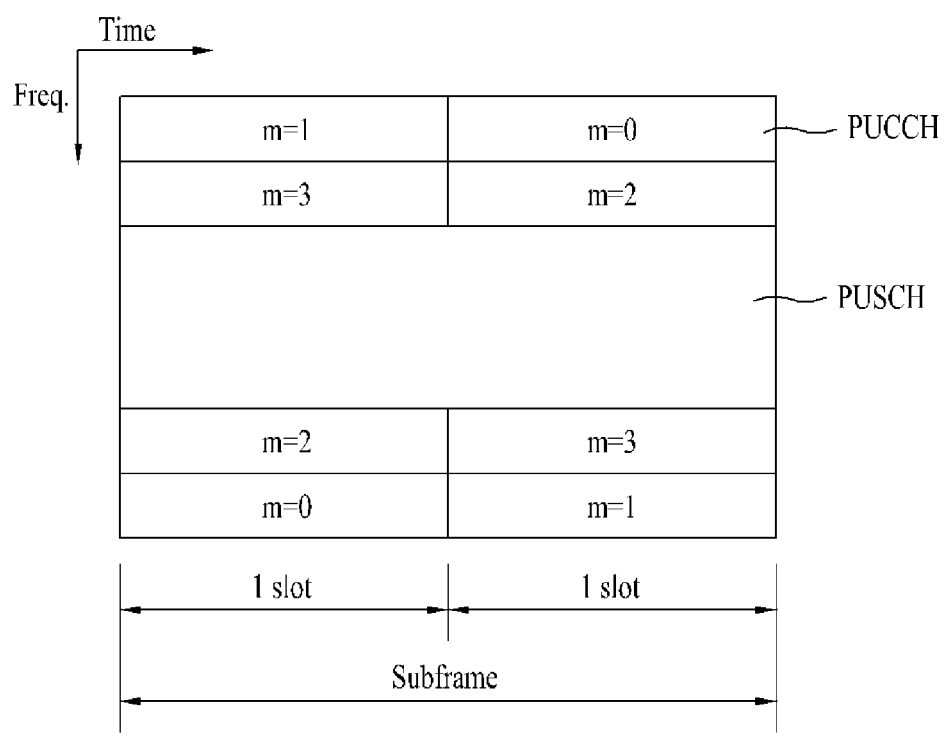
FIG. 8 is a diagram for one example of a structure of an uplink (UL) subframe used by LTE system.

FIG. 8 is a diagram for one example of a structure of an uplink (UL) subframe used by LTE system.

Referring to FIG. 8, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 7 shows one example that PUCCH (m=0), PUCCH (m=1), PUCCH (m=2), and PUCCH (m=3) are assigned to the subframe.

Meanwhile, if a channel status between a base station and a user equipment is poor, a relay node (RN) is installed between base station and the user equipment in order to provide a radio channel having a better channel status to the user equipment. In addition, a relay node is introduced to a cell edge region having a poor channel status to provide a high-speed data channel and to extend a cell service area. Thus, the relay node is being widely used to resolve the problem of the propagation shade region in a wireless communication system.

Compared to the conventional relay node having a restricted function of a repeater capable of amplifying and transmitting a signal, the latest relay node technology is being developed to cover more intelligent functions. Moreover, the relay node technology is the technology mandatory to reduce the cost requisite for establishing more base stations and the maintenance cost of a backhaul network in the next generation mobile communication system, to extend the service coverage, and to raise a data processing rate. As the relay node technology tends to be further developed, the necessity for a relay node used in the conventional wireless communication system to be supported by the new wireless communication system is rising correspondingly.

As a relay node is introduced to play a role in forwarding a link connection between a base station and a user equipment in 3GPP LTE-A (3rd generation partnership project long term evolution-advanced) system, two kinds of links differing from each other in attributes are applied to a UL carrier frequency band and a DL carrier frequency band, respectively. A connection link part established between the base station and the relay node may be represented by being defined into a backhaul link. If a transmission is performed in a manner that a backhaul link uses a DL frequency band resource (e.g., the case of Frequency Division Duplex (FDD)) or a DL subframe resource (e.g., the case of Time Division Duplex (TDD)), it may be represented as a backhaul downlink. If a transmission is performed in a manner that a backhaul link uses a UL frequency band resource (e.g., the case of FDD) or a UL subframe resource (e.g., the case of TDD), it may be represented as a backhaul uplink.

Figure 9:
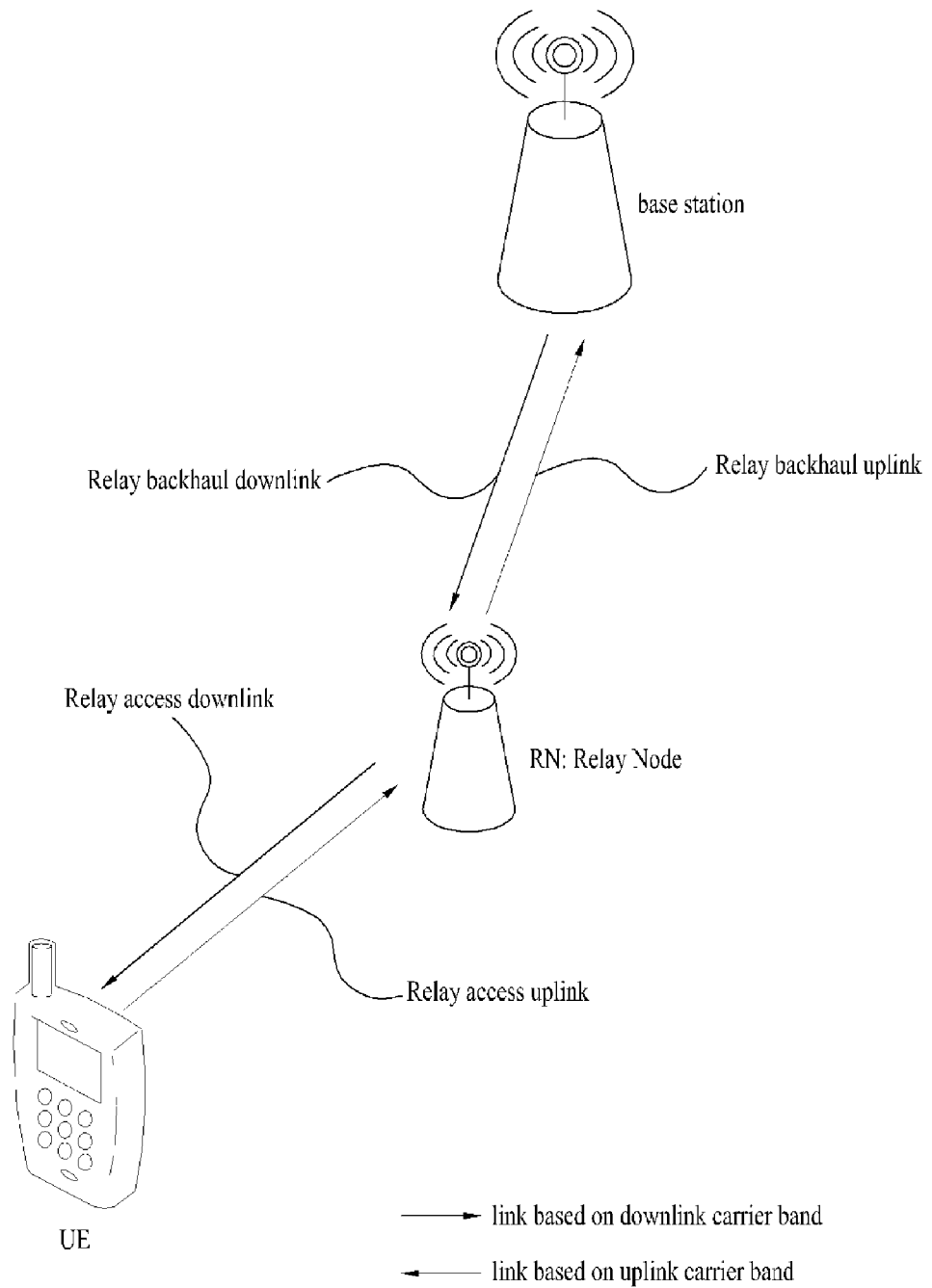
FIG. 9 is a diagram for configurations of a relay backhaul link and a relay access link in a wireless communication system.

FIG. 9 is a diagram for configurations of a relay backhaul link and a relay access link in a wireless communication system.

Referring to FIG. 9, as a relay node is introduced to play a role in forwarding a link connection between a base station and a user equipment, two kinds of links differing from each other in attributes are applied to a UL carrier frequency band and a DL carrier frequency band, respectively. A connection link part established between the base station and the relay node may be represented by being defined into a relay backhaul link. If a transmission is performed in a manner that a backhaul link uses a DL frequency band resource (e.g., the case of Frequency Division Duplex (FDD)) or a DL subframe resource (e.g., the case of Time Division Duplex (TDD)), it may be represented as a backhaul downlink. If a transmission is performed in a manner that a backhaul link uses a UL frequency band resource (e.g., the case of FDD) or a UL subframe resource (e.g., the case of TDD), it may be represented as a backhaul uplink.

On the other hand, a connection link part established between a relay node (RN) and a series of user equipments may be represented by being defined into a relay access link. If a transmission is performed in a manner that the relay access link uses a downlink frequency band resource (e.g., the case of FDD) or a downlink subframe resource (e.g., the case of TDD), it may be represented as an access downlink. If a transmission is performed in a manner that the relay access link uses an uplink frequency band resource (e.g., the case of FDD) or an uplink subframe resource (e.g., the case of TDD), it may be represented as an access uplink.

A relay node (RN) can receive information from a base station in a relay backhaul downlink and is able to transmit information to the base station in a relay backhaul uplink. In addition, the relay node can transmit information to the user equipment in a relay access downlink or is able to receive information from the user equipment in a relay access uplink.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment communicates with a network through a relay node. And, the 'non-transparent' may mean a case that a user equipment is able to recognize whether the user equipment communicates with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identifier (ID), the relay node does not have a cell identity of its own. If at least one portion of RPM (Radio Resource Management) is controlled by a base station having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relay nodes, a variety of L2 (2nd layer) relay nodes, and type-2 relay nodes may belong to the category of the above-mentioned relay node.

Regarding a relay node configured to control a cell by itself, this relay node controls one or more cells, a unique physical layer cell identity is provided to each cell controlled by the relay node, and the same RPM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 (3rd layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and may be able to transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1a relay node is operated in the out-band, and has the same features as those of the type-1 relay node. Operation of the type-1a relay node may be configured to minimize (or eliminate) the influence on L1 ($1^{st}$ layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, in order for a relay node to operate in in-band, prescribed resources in time-frequency space must be reserved for a backhaul link and these resources may be configured not be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDD, a backhaul downlink transmission is performed in a downlink subframe of a base station or a relay node, and a backhaul uplink transmission is performed in an uplink subframe of the base station or the relay node.

In case of an in-band relay ode, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on or under the ground).

As one solution for the above signal interference problem, a relay node is set not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 10:
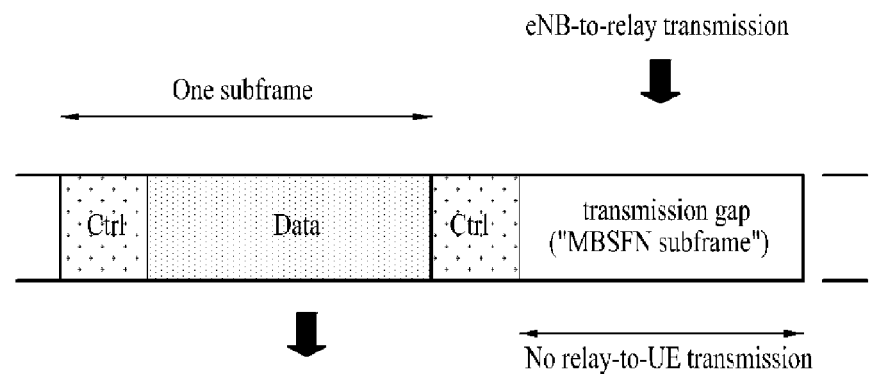
FIG. 10 is a diagram for one example of relay node resource partition.

FIG. 10 is a diagram for one example of relay node resource partitioning.

Referring to FIG. 10, in a first subframe that is a normal subframe, a downlink (i.e., an access downlink) control signal and data are transmitted from a relay node to a user equipment. In a second subframe that is an MBSFN subframe, while a control signal is transmitted from the relay node to the user equipment on a control region of a downlink subframe but any transmission from the relay node to the user equipment is not performed in the rest region of the downlink subframe. In doing so, since a legacy user equipment expects a transmission of physical downlink control channel (PDCCH) in all downlink subframes (i.e., the relay node needs to support legacy user equipments within a coverage of the relay node to receive PDCCH in each subframe and to perform a measurement function thereof), it is necessary for the PDCCH to be transmitted in all the downlink subframes in order for each legacy user equipment to operate correctly. Therefore, in a subframe (e.g., second subframe) configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH is transmitted from the relay node to the user equipment in a control region of the second subframe, it is able to provide backward compatibility with a legacy user equipment served by the relay node. While no signal is transmitted in the rest region of the second subframe from the relay node, the relay node may be able to receive a transmission from the base station. Therefore, the above-mentioned resource partitioning scheme can prevent the access downlink transmission and the backhaul downlink reception from being simultaneously performed by the in-band relay node.

The second subframe, which uses the MBSFN subframe, shall be described in detail as follows. First of all, a control region of the second subframe may be referred to as a relay node non-hearing interval. In particular, the relay node non-hearing interval may mean the interval in which a relay node transmits an access downlink signal instead of receiving a backhaul downlink signal. As mentioned in the foregoing description, this relay node non-hearing interval may be configured to have 1-, 2- or 3-OFDM length. In the relay node non-hearing interval, a relay node performs an access downlink transmission to a user equipment and may receive a backhaul downlink from a base station in the rest of the relay node non-hearing interval. In doing so, since the relay node is unable to perform both transmission and reception on the same frequency band, it may take a time to enable the relay node to be switched from a transmitting mode to a receiving mode. Hence, it may be necessary to configure a guard time (GT) to enable the relay node to perform a transmitting/receiving mode switching in first partial interval of a backhaul downlink receiving region. Similarly, even if the relay node operates in a manner of receiving a backhaul downlink from the base station and transmitting and access downlink to the user equipment, it may be able to configure a guard time (GT) for the transmitting/receiving mode switching of the relay node. The length of the guard time may be defined as a value in time domain. For example, the length of the GT may be defined as k time samples (Ts) (where, k≥1) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not configured. In order to maintain backward compatibility, this guard time may be defined only in a frequency domain configured for a backhaul downlink subframe transmission (i.e., a legacy user equipment is not supportable if a guard time is configured in an access downlink interval). In the backhaul downlink receiving interval except the guard time, the relay node may be able to receive relay node dedicated PDCCH and PDSCH from the base station. In the meaning of a relay node dedicated physical channel, the PDCCH and the PDSCH may also be represented as Relay-PDCCH (R-PDCCH) and R-PDSCH (Relay-PDSCH), respectively. And, a user equipment in the course of a communication with a relay node may be represented as R-UE.

Meanwhile, a search space for a relay node, i.e., a search space for R-PDCCH is configured by upper layer signaling. Particularly, a search space for a DL grant may be located in a 1$^{St}$ slot and a search space for a UL grant may be located in a 2$^{nd}$ slot. Moreover, a search space for a DL grant and a search space for a UL grant may be configured independent from each other or mutually dependent on each other.

In the following description, assume that a search space for a DL grant and a search space for a UL grant can be configured by an RRC signaling corresponding to one upper layer signal or RRC signalings (i.e., two upper layer signals) respectively corresponding to the search spaces.

Figure 11:
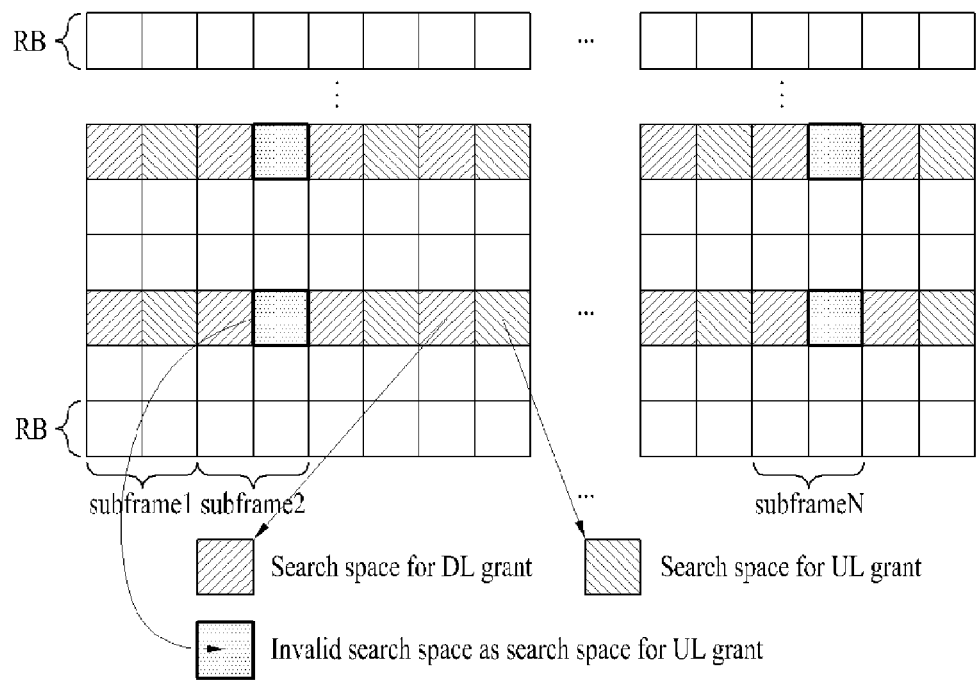
FIG. 11 is a diagram for one example of configuring a search space for a relay node according to an embodiment of the present invention.

FIG. 11 is a diagram for one example of configuring a search space for a relay node according to an embodiment of the present invention.

Referring to FIG. 11, it can be observed that a search space for a DL grant and a search space for a UL grant are identically configured across several subframes in accordance with time. For clarity of the following description, FIG. 11 shows one example that a location of a search space on a frequency is fixed to a specific resource block. Yet, a location on a frequency may vary in accordance with time depending on upper layer signaling.

Meanwhile, in case of TDD system, DL-standalone subframe may exist in accordance with a specific TDD configuration. In this case, in viewpoint of a relay node, it may happen that a reception of a UL grant is not expected in a specific subframe. For reference, various TDD configurations may be configured as shown in Table 2 below.

TABLE 2

| Subframe Configuration TDD | eNB-RN uplink-downlink configuration | Subframe number n | | | | | | | | | |
|---|---|---|---|---|---|---|---|---|---|---|---|
| | | 0 | 1 | 2 | 3 | 4 | 5 | 6 | 7 | 8 | 9 |
| 0 | 1 | | | | D | | | | U | | |
| 1 | | | U | | | | | | | | D |
| 2 | | | | | D | | | | U | | D |
| 3 | | | | U | D | | | | | | D |
| 4 | | | | U | D | | | | U | | D |
| 5 | 2 | | U | | | D | | | | | |
| 6 | | | | | D | | | U | | | |
| 7 | | | U | | D | | | | D | | |
| 8 | | | | D | | | | U | | D | |
| 9 | | | U | D | D | | | | D | | |
| 10 | | | | D | | | | U | D | D | |
| 11 | 3 | | U | | | | | | D | D | D |
| 12 | | | U | | | | | D | D | D | |
| 13 | 4 | U | | | | | | | | | D |
| 14 | | | U | | | | D | | | | D |
| 15 | | | U | | | | | | D | D | |
| 16 | | | U | | | | D | D | D | | |
| 17 | | | U | D | | | D | D | D | | |
| 18 | 6 | | | U | | | | | | | D |

Assuming that a subframe 2 and a subframe N correspond to DL-standalone subframes in FIG. 11, even if upper layer signaling for configuring a 2$^{nd}$ slot as a search space of a UL grant is received in the subframe 2 and the subframe N, the corresponding subframe is regarded as an invalid subframe for the search space of the UL grant and the search space of the corresponding UL grant is regarded as an invalid search space. Of course, assume that a search space for a DL grant and a search space for a UL grant are configured through one upper layer signaling.

The feature of the search space configuration for the relay node of the present invention disclosed in FIG. 11 lies in that a substantial search space is changeable in each subframe. In particular, a search space, in which a DL grant and a UL grant can be actually transmitted, exists in a specific subframe. Yet, a search space for a DL grant only is configured in another subframe set, i.e., an invalid subframe as a search space for a UL grant.

Meanwhile, since a UL grant is not transmitted in the invalid search space, PDSCH may be mapped to the corresponding space. In particular, it is able to minimize waste of resource by means of using a space in which a UL grant does not exist.

Explained in the following description is one example of a case that a search space for a DL grant and a search space for a UL grant are configured distinguishably different from each other.

Figure 12:
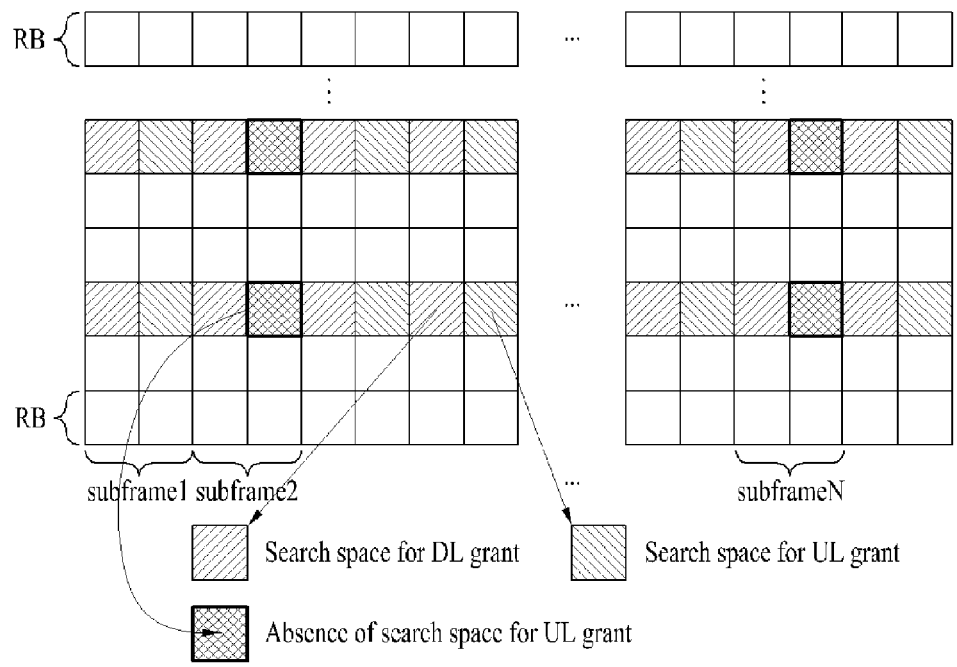
FIG. 12 is a diagram for another example of configuring a search space for a relay node according to an embodiment of the present invention.

FIG. 12 is a diagram for another example of configuring a search space for a relay node according to an embodiment of the present invention.

Referring to FIG. 12, it can be observed that a search space for a DL grant and a search space for a UL grant are configured different from each other across several frames in accordance with time. In particular, a search space for a UL grant does not exist in a subframe 2 and a subframe N at all.

Hence, a UL grant is not transmittable in a subframe having no search space for the UL grant. In viewpoint of a relay node, a reception of the UL grant is not expected.

FIG. 12 differs from FIG. 11 in that a search space for a UL grant is not configured in a subframe, in which the UL grant is not transmitted certainly, at all. In particular, since a presence or non-presence of a search space for a UL grant is determined for each subframe, a subframe including the search space for the UL grant may be regarded as a partial set of a subframe including a search space for a DL grant.

Meanwhile, a signaling for indicating a subframe, in which a search space for a UL grant is present, and a signaling for indicating a subframe, in which a search space for a UL grant, are necessary. Optionally, one signaling can discriminate the subframes from each other.

Likewise, in a subframe having no search space for a UL grant, PDSCH may be mapped to the corresponding space, whereby waste of resource can be minimized.

Figure 13:
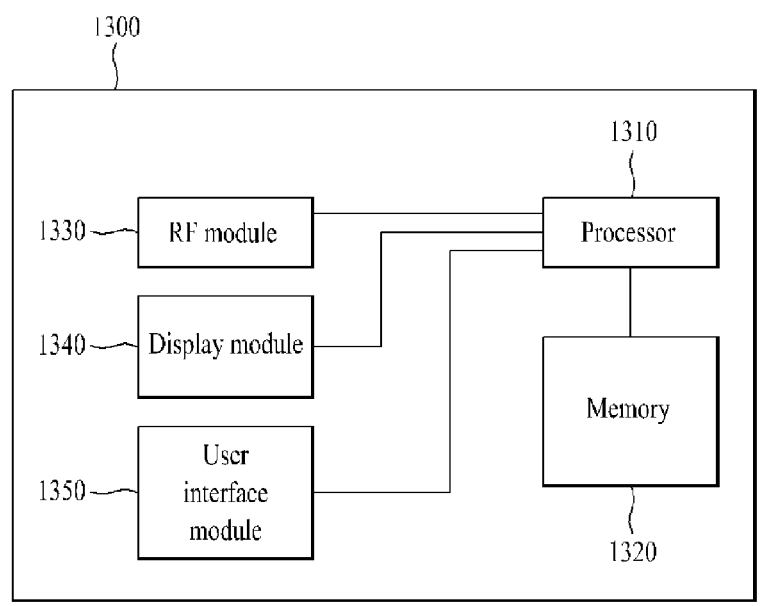
FIG. 13 is a block diagram for one example of a communication device according to one embodiment of the present invention.

FIG. 13 is a block diagram for one example of a communication device according to one embodiment of the present invention.

Referring to FIG. 13, a communication device 1300 includes a processor 1310, a memory 1320, an RF module 1330, a display module 1340 and a user interface module 1350.

The communication device 1300 is illustrated for clarity and convenience of the description and some modules can be omitted. Moreover, the communication device 1300 may further include at least one necessary module. And, some modules of the communication device 1300 can be further divided into sub-modules. The processor 1310 is configured to perform operations according to the embodiment of the present invention exemplarily described with reference to the accompanying drawings. In particular, the detailed operations of the processor 1310 can refer to the contents described with reference to FIGS. 1 to 12.

The memory 1320 is connected to the processor 1310 and stores an operating system, applications, program codes, data and the like. The RF module 1330 is connected to the processor 1310 and performs a function of converting a baseband signal to a radio signal or converting a radio signal to a baseband signal. For this, the RF module 1330 performs analog conversion, amplification, filtering and frequency uplink transform or inverse processes thereof. The display module 1340 is connected to the processor 1310 and displays various kinds of informations. The display module 1340 can include such a well-known element as LCD (Liquid Crystal Display), LED (Light Emitting Diode), OLED (Organic Light Emitting Diode) and the like, by which the present invention is non-limited. The user interface module 1350 is connected to the processor 1310 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In the present disclosure, embodiments of the present invention are described centering on the data transmission/reception relations between a relay node and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of configuring a search space for a relay node in a wireless communication system and apparatus therefor are described mainly with reference to examples applied to 3GPP LTE system, as mentioned in the foregoing description, the present invention is applicable to various kinds of wireless communication systems as well as the 3GPP LTE system.

What is claimed is:

1. A method for obtaining control information by a relay node in a wireless communication system, the method comprising:

receiving, by the relay node, search space configuration information for configuring a first search space for a downlink grant and configuring a second search space for an uplink grant in a data region of a subframe via a higher layer signaling;

receiving, by the relay node, downlink standalone subframe information indicating which subframe is a downlink standalone subframe; and obtaining, by the relay node, the control information for the relay node by:

performing blind decoding on the first search space other than the second search space, when the downlink standalone subframe information indicates that the subframe is the downlink standalone subframe, and performing blind decoding on both the first search space and the second search space, when the downlink standalone subframe information indicates that the subframe is not the downlink standalone subframe, wherein the second search space is configured as an invalid search space and a data channel is mapped to the invalid search space when the downlink standalone subframe information indicates that the subframe is the downlink standalone subframe.

2. The method of claim 1, wherein the first search space is located in a first slot of the subframe, and wherein the second search space is located in a second slot of the subframe.

3. A relay node in a wireless communication system, the relay node comprising:

a radio frequency (RF) module; and a processor configured to:

control the RF module to receive search space configuration information for configuring a first search space for a downlink grant and configuring a second search space for an uplink grant in a data region of a subframe via a higher layer signaling control the RF module to receive downlink standalone subframe information indicating which subframe is a downlink standalone subframe, and obtain control information for the relay node by:

performing blind decoding on the first search space other than the second search space, when the downlink standalone subframe information indicates that the subframe is the downlink standalone subframe, and performing blind decoding on both the first search space and the second search space , when the downlink standalone subframe information indicates that the subframe is not the downlink standalone subframe, wherein the processor configures the second search space as an invalid search space and receives a data channel in the invalid search space when the downlink standalone subframe information indicates that the subframe is the downlink standalone subframe.

4. The relay node of claim 3, wherein the first search space is located in a first slot of the subframe, and wherein the second search space is located in a second slot of the subframe.

* * * * *